United States Patent [19]

Dison et al.

[11] 4,038,189
[45] July 26, 1977

[54] FLUID DUAL FILTER

[75] Inventors: James R. Dison; George A. Thomson, both of Indianapolis, Ind.

[73] Assignee: The United States of America as represented by the Secretary of the Air Force, Washington, D.C.

[21] Appl. No.: 649,764

[22] Filed: Jan. 16, 1976

[51] Int. Cl.² .............................................. B01D 35/14
[52] U.S. Cl. ..................... 210/90; 210/132; 210/137; 210/316; 210/DIG. 13
[58] Field of Search ................. 210/90, 130, 132, 133, 210/137, 314, 316, 340, 440, 453, DIG. 13

[56] References Cited

U.S. PATENT DOCUMENTS

| | | | |
|---|---|---|---|
| 1,668,071 | 5/1928 | Hart | 210/453 X |
| 2,605,904 | 8/1952 | Ogilvie | 210/DIG. 13 |
| 3,065,854 | 11/1962 | Winslow | 210/130 |
| 3,165,469 | 1/1965 | Bruns et al. | 210/453 X |
| 3,270,884 | 9/1966 | Bremer | 210/132 X |
| 3,283,904 | 11/1966 | Buckman et al. | 210/132 |
| 3,397,786 | 8/1968 | Hultgren | 210/132 |
| 3,539,009 | 11/1970 | Kudlaty | 210/132 X |
| 3,975,273 | 8/1976 | Shaltz et al. | 210/314 X |

Primary Examiner—Thomas G. Wyse
Assistant Examiner—R. G. Mukai
Attorney, Agent, or Firm—Joseph E. Rusz; Jacob N. Erlich

[57] ABSTRACT

A fluid dual filter having a primary fine mesh filter element, a secondary coarser mesh element in parallel with the main or primary element and a plurality of bypass valves which are normally closed to block flow through the secondary filter element but which open at an elevated fluid pressure caused by blockage of the main filter element thereby allowing flow through the secondary filter element. The valves are located downstream of the secondary filter element in order to prevent their contamination by any foreign matter in the fluid to be passed through the filter.

1 Claim, 2 Drawing Figures

FLUID DUAL FILTER

STATEMENT OF GOVERNMENT INTEREST

The invention decribed herein may be manufactured and used by or for the Government for governmental purposes without the payment of any royalty thereon.

BACKGROUND OF THE INVENTION

This invention relates generally to filtering devices and more particularly to a dual filtering system which allows fluid flow to continue through the filter even after the primary filter element has become clogged.

In many of todays high temperature, high output engines such as found in ships, automobiles and, more particularly, aircraft it is essential that these engines produce a high output as efficiently as possible. In the area of aircraft engine design, the following are some of the major design, process and material details and component improvements that have been utilized to permit higher speeds and higher cylinder temperatures and pressure, and to reduce local hot spots for higher overall engine performance on a given fuel: (1) higher-strength and temperature resistant materials resulting from alloy improvement; (2) use of induction hardening, carburizing of nitriding steels for higher strength and long wear characteristics, particularly where rubbing occurs, such as on cylinder barrel walls, piston rings, crankshafts, piston pins, link pins, and gears; (3) use of shot peening or surface rolling on highly stressed parts to eliminate residual stresses and add light compressive stresses for maximum uniformity, particularly at stress concentrations such as valve springs, connecting rods, rocker arms, and welded areas; (4) surface coating for improved functioning, which included such items as steel-backed, silver-plated master rod bearings with lead-indium coating; flame plating of high temperature alloys on valve seat faces and insert seats; and silver, copper or other coating, plating, or surface treatment to eliminate fretting, fretting erosion, or other action leading to fatigue cracks; (5) closer spacing and thinner fins or aluminum cylinder heads and steel barrels, with improved baffling for more uniform and better cylinder cooling; and (6) tapered piston rings for higher-temperature piston operation without ring sticking.

One area which has not been covered above and which is extremely essential in high speed engine design is the fluid filtering system. This system, for efficient operation, requires periodic and systematic cleaning or replacement of filtering elements to avoid eventual clogging of these elements. As they become clogged a gradual lessening of output pressure begins. To overcome this problem, in the past, these filtering elements had to be replaced at frequent intervals so as to avoid any engine inefficiency, or complete breakdown. Such a continual replacement of filters is not only expensive but also time consuming. In addition, if these filters are not changed at frequent intervals in time engine failure may easily occur.

SUMMARY OF THE INVENTION

The instant invention sets forth a dual filter which may be used with oil or any other fluid to be filtered and thereby substantially overcomes the problems set forth above. The filter of the instant invention utilizes primary and secondary filtering elements to permit extended safe equipment operation after clogging of the primary element. This is accomplished by mounting a primary filtering element of fine mesh material in parallel with a secondary filtering element of coarser mesh material. Under normal conditions all flow is directed through the primary or main filter for use within the engine. When this main or primary filter becomes clogged an increased back pressure is sensed and a plurality of valves are opened to allow fluid to flow through the secondary or coarser filter element.

Initially, the increased pressure drop due to collection of debris in the primary filter is sensed and at a selected level causes the protrusion of an indicator visible to maintenance personnel indicating the need for a routine primary filter element change. Further clogging of the filter element, as indicated by increasing pressure drop, is sensed, and, at a selected pressure drop level, an operator warning signal is activated. Additional pressure drop increase causes activation of the primary filter by-pass system. In addition to the elements set forth hereinabove this invention locates the plurality of valves downstream of the secondary filter element in order to prevent their contamination by any dirt or foreign matter in the fluid. Also the secondary filter is mounted vertically above the primary filter so gravity prevents contamination of the secondary filter by the contaminants trapped in the primary filter when the engine is shut-down. Mechanical or electrical signals can be used to activate the valves in response to the primary filter pressure drop signal.

It is therefore an object of this invention to provide a fluid dual filter which is capable of continual operation even after the main or primary filter has become clogged.

It is another object of this invention to provide a fluid dual filter which utilizes a plurality of valves located downstream from the secondary filter element so as to prevent their contamination.

It is another object of this invention to provide a daul fluid filter which is easily adaptable to a variety of engines and which is economical to produce and which utilizes conventional, currently available components that lend themselves to standard mass producing manufacturing techniques.

For a better understanding of the present invention together with other and further objects thereof, reference is made to the following description taken in conjunction with the accompanying drawing and its scope will be pointed out in the appended claims.

DETAILED DESCRIPTION OF THE PREFERRED EMBODIMENT

Figure 1:
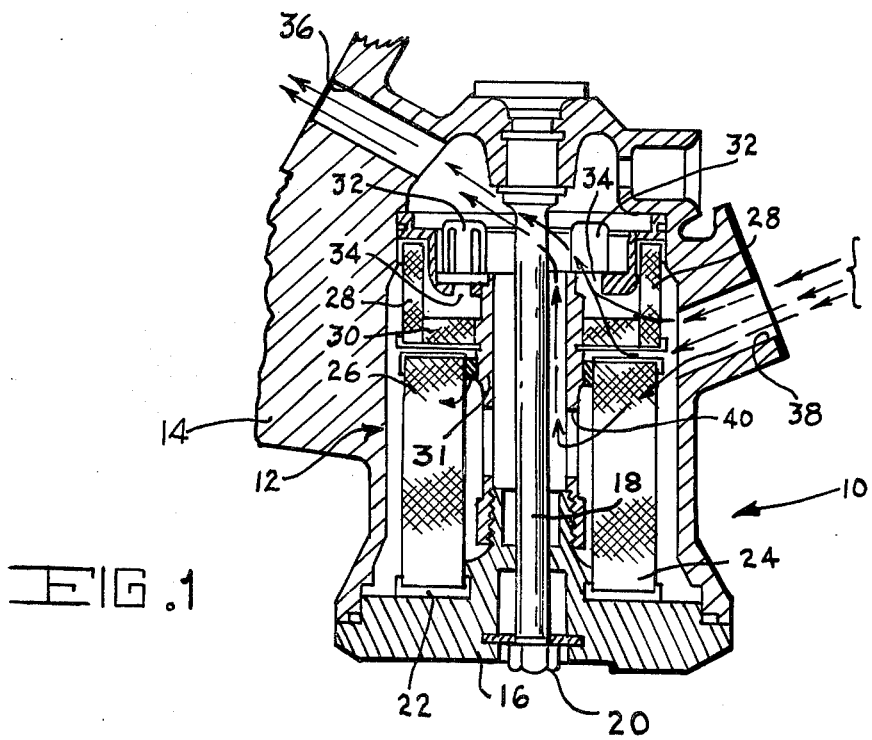
FIG. 1 is a side elevational view shown partly in cross section of the fluid dual filter of this invention.

Reference is now made to FIG. 1 of the drawing which best shows the fluid dual filter 10 of this invention and the elements associated therewith. Filter 10 is made up of a housing 12 constructed of any suitable material such as cast iron or aluminum and this housing 12 is formed in two basic sections, a body 14 and a base plate or cover 16. Cover 16 is secured to body 14 by any conventional securing method which in this invention takes the form of a center bolt 18 and nut 20.

Removeably mounted on support 22 of base plate or cover 16 is a cylindrically shaped main or primary filter element 24. Primary filter element 24 is preferably a 30-micron filter of fine mesh material, although any other comparable filter element may be utilized. To additionally support and seal the filter element 24 within housing 12 any suitable low friction element such as suitable elastomeric O-ring 26 may be used. Also located within housing 12 is a secondary and coarser filter element 28 of 140-microns. Secondary filter 28 is of a cylindrical configuration having an extended bottom portion 30 and is removably mounted by any conventional means on a removable by-pass valve housing assembly 31. Filters 24 and 28 are removed as a unit. The design requires their removal for inspection before an actuated indicator can be reset.

A plurality of valves 32 operated by primary filter pressure drop are located within passageway 34 between secondary filter 28 and an outlet 36 formed in body 14 of housing 12. The operation of these valves will be described in detail hereinbelow.

Housing 12 has an inlet opening 38 which allows fluid flow therethrough. Fluid passes from inlet 38 to primary filter element 24 as well as through secondary filter 28. When valves 32 are in the closed position the fluid cannot pass to outlet 36 by way of filter 28 and therefore all fluid flow is through primary filter 24. When valves 32 open in the manner described hereinbelow the fluid flows through filter 28, through valves 32 and onto outlet 36.

Figure 2:
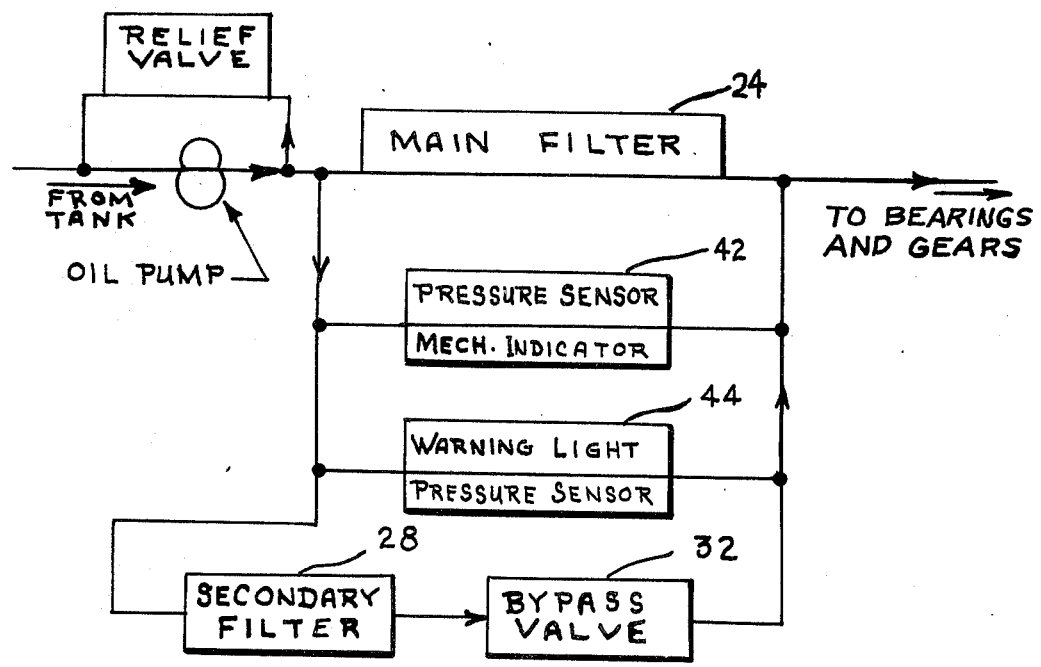
FIG. 2 is a schematic representation of the operation of the elements forming part of and used in conjunction with the fluid dual filter of this invention.

Reference is now made to FIGS. 1 and 2 for purposes of describing the operation of this invention. In operation under normal conditions, fluid flow passes through inlet 38 to primary filter 24. Fluid from filter 24 flows through an aperture 40 within assembly 31 and onto outlet 36 for use within an engine associated therewith. Any conventional pressure sensor or detector 42 as shown in FIG. 2 senses the incoming pressure through inlet 38. Upon an increase of pressure differential, which may occur when filter 24 becomes clogged, sensor 42 activates any conventional warning indicator such as a "Pop-Out" button. Additional pressure differential causes sensor 44 to activate a warning light visible to the equipment operator. The by-pass valves 32 are opened by the pressure drop across the primary filter 24.

It is therefore possible to efficiently operate an engine even with the main or primary filter 24 clogged until it is possible to reasonably stop operation of the engine and replace the filters. As a result, this invention provides an inexpensive flow dual filter for continued efficient engine operation. Although this invention has been described with reference to a particular embodiment it will be understood to those skilled in the art that this invention is also capable of a variety of alternate embodiments within the spirit and scope of the appended claims.

We claim:

1. A fluid dual filter comprising a housing, said housing comprising a body and a base plate, said body and said base plate being removably secured together by a central tie bolt and nut, said body having a fluid inlet and a fluid outlet, said fluid outlet being positioned vertically above said fluid inlet, a primary filter means in the form of a fine mesh filter element being removably mounted within said body on said base plate, a secondary filter means in the form of a coarse mesh filter element mounted within said body, said secondary filter element being mounted vertically above said primary filter element to prevent contamination of said secondary filter element by contaminants trapped on the surface of said primary filter element, said primary and secondary filter means being located between said inlet and said outlet, a plurality of bypass valves being located within said body between said secondary filter means and said outlet, said valves being constructed and arranged to prevent fluid from passing through said coarse mesh filter element until a predetermined pressure differential between the inlet and the outlet is obtained and means for sensing fluid pressure differentials between said inlet and said outlet and activating a first warning indicator at a predetermined pressure differential and activating a second warning indicator at pressure differentials greater than said predetermined pressure differential.

* * * * *